United States Patent
Pinnekamp et al.

(10) Patent No.: US 10,400,860 B2
(45) Date of Patent: Sep. 3, 2019

(54) TRANSMISSION ARRANGEMENT

(71) Applicant: RENK AKTIENGESELLSCHAFT, Augsburg (DE)

(72) Inventors: Burkhard Pinnekamp, Augsburg (DE); Mohamed Sfar, Hörstel (DE)

(73) Assignee: RENK Aktiengesellschaft, Augsburg (DE)

( * ) Notice: Subject to any disclaimer, the term of this patent is extended or adjusted under 35 U.S.C. 154(b) by 0 days.

(21) Appl. No.: 15/551,228

(22) PCT Filed: Feb. 8, 2016

(86) PCT No.: PCT/EP2016/000202
§ 371 (c)(1),
(2) Date: Aug. 15, 2017

(87) PCT Pub. No.: WO2016/131529
PCT Pub. Date: Aug. 25, 2016

(65) Prior Publication Data
US 2018/0023667 A1    Jan. 25, 2018

(30) Foreign Application Priority Data
Feb. 17, 2015 (DE) .......... 10 2015 002 029

(51) Int. Cl.
*F16H 1/22* (2006.01)
*F16H 1/28* (2006.01)
(Continued)

(52) U.S. Cl.
CPC .......... *F16H 1/2836* (2013.01); *F16H 1/22* (2013.01); *F16H 1/46* (2013.01); *F16H 1/18* (2013.01)

(58) Field of Classification Search
CPC . F16H 1/2836; F16H 1/46; F16H 1/22; F16H 1/18
(Continued)

(56) References Cited

U.S. PATENT DOCUMENTS 1,740,756 A * 12/1929 Weis .......... F16H 1/22
74/410
2,423,820 A * 7/1947 Baumann ........ F16D 67/00
192/3.22
(Continued)

FOREIGN PATENT DOCUMENTS

CN    103542038    1/2014
DE    1206254 B    12/1965
(Continued)

OTHER PUBLICATIONS

English translation of CN103542038A; http://translationportal.epo.org; Jan. 16, 2019 (Year: 2019).*
(Continued)

*Primary Examiner* — Roger L Pang
(74) *Attorney, Agent, or Firm* — Cozen O'Connor

(57) ABSTRACT

A transmission arrangement with a first rotatably mounted drive-side shaft paired with a first drive toothing; a second rotatably mounted drive-side side shaft paired with a second drive toothing; a rotatably mounted ouput-side shaft paired with an output toothing; a first number of first planet shafts, each of the first planet shafts being paired with a first planet toothing and a third planet toothing; and a second number of second planet shafts, each being paired with a second planet toothing and a fourth planet toothing. The first drive-side shaft and the second drive-side shaft are coaxially relative to each other; the first planet toothing engaged with the first drive toothing; the second planet toothing engaged with the
(Continued)

second drive toothing; and the third planet toothing and the fourth planet toothing are engaged with the output toothing.

14 Claims, 2 Drawing Sheets

(51) Int. Cl.
    *F16H 1/46*     (2006.01)
    *F16H 1/18*     (2006.01)

(58) Field of Classification Search
    USPC .............................. 475/338, 339; 74/330, 331
    See application file for complete search history.

(56) References Cited

U.S. PATENT DOCUMENTS

| | | | |
|---|---|---|---|
| 6,334,368 B1* | 1/2002 | Morrow | F16H 1/22 74/410 |
| 8,733,193 B2* | 5/2014 | Cimatti | B60K 6/48 74/330 |
| 8,733,194 B2* | 5/2014 | Mellet | F16H 3/006 74/331 |
| 2009/0019967 A1 | 1/2009 | Himmelmann | |
| 2010/0120573 A1 | 5/2010 | Benito | |
| 2011/0247439 A1* | 10/2011 | Zhou | F16H 1/22 74/331 |
| 2012/0302387 A1 | 11/2012 | Scekic et al. | |
| 2018/0100562 A1* | 4/2018 | Beck | F02C 7/36 |

FOREIGN PATENT DOCUMENTS

| | | |
|---|---|---|
| DE | 2029371 | 1/1972 |
| DE | 10 2005 012 226 | 6/2006 |
| DE | 10 2012 013 834 | 1/2014 |
| GB | 1310417 | 3/1973 |
| JP | 2004-332826 | 11/2004 |
| WO | WO 02/09998 | 2/2002 |

OTHER PUBLICATIONS

Office Action dated Jul. 13, 2018 issued in the corresponding Japanese Patent Application No. 2017-560874.
Office Action dated Aug. 23, 2018 issued in the corresponding Korean Patent Application No. 10-2017-7026080.
Office Action dated Nov. 5, 2018 issued in Chinese Patent Application No. 201680010777.3.
Office Action dated Mar. 7, 2019 issued in Korean Patent Application No. 10-2017-7026080.
Office Action dated Jul. 16, 2019 issued in Indian Patent Application No. 201747028815.

* cited by examiner

TRANSMISSION ARRANGEMENT

CROSS REFERENCE TO RELATED APPLICATIONS

This is a U.S. national stage of application No. PCT/EP2016/000202, filed on Feb. 8, 2016. Priority is claimed on German Application No. DE102015002029.3, filed Feb. 17, 2015, the content of which is incorporated here by reference.

BACKGROUND OF THE INVENTION

1. Field of the Invention

The invention relates to a transmission arrangement.

2. Description of the Prior Art

From DE 10 2012 013 83 A1 a transmission arrangement is known, which provides drive power on a single drive-side shaft that can be transmitted in the direction of a single output-side shaft. In particular when drive power is provided on two drive-side shafts, the transmission arrangement known from DE 10 2012 013 834 A1 cannot be employed.

SUMMARY OF THE INVENTION

There is a need for a transmission arrangement which, emanating from two drive-side shafts, can transmit drive power in the direction of an output-side shaft.

One aspect of the invention is based on the object of creating a new type of transmission arrangement.

According to a first aspect of the invention the transmission arrangement comprises a rotatably mounted first drive-side shaft onto which a first drive toothing is moulded; a rotatably mounted second drive-side shaft onto which a second drive toothing is moulded; a rotatably mounted output-side shaft, onto which an output toothing is moulded; a first number of first planet shafts, wherein onto each of the first planet shafts a first planet toothing each and axially offset a third planet toothing is moulded; a second number of second planet shafts, wherein onto each of the second planet shafts a second planet toothing each and axially offset a fourth planet toothing is moulded; wherein the first drive-side shaft and the second drive-side shaft run coaxially to one another; wherein the first planet toothings of the first planet shafts are in engagement with the first drive toothing and the second planet toothings of the second planet shafts with the second drive toothing; and wherein the third planet toothings of the first planet shafts and the fourth planet toothings of the second planet shafts are in engagement with the output toothing. With this transmission arrangement, drive power, emanating from two drive-side shafts, can be particularly advantageously transmitted in the direction of a common output-side shaft.

According to an advantageous further development of the transmission arrangement according to the first aspect of the invention, the first and second drive toothing prepared on the different drive shafts and the first and second planet toothings prepared on the different planet shafts are each formed as helical toothings with opposing helix angles. Because of this, forces acting on the drive toothing can be advantageously adjusted.

According to a further advantageous further development of the transmission arrangement according to the first aspect of the invention, the first number of first planet shafts and the second number of first planet shafts is greater than two in each case; wherein seen in circumferential direction the first planet toothings and the second planet toothings are equally distributed in such a manner that between each two adjacent first planet toothings a second planet toothing each is positioned; and wherein seen in axial direction the first planet toothings and the second planet toothings just like the first drive tooting and the second drive toothing are offset relative to one another. This design allows a particularly advantageous transmission of the drive moment provided by two drive-side shafts in the direction of a common output-side shaft.

According to one aspect of the invention, the transmission arrangement comprises a rotatably mounted first drive-side shaft, onto which a first drive toothing is moulded; a rotatably mounted second drive-side shaft, onto which a second drive toothing is moulded; a rotatably mounted output-side shaft, onto which an output toothing is moulded; planet shafts, wherein onto each of the planet shafts a first planet toothing each, axially offset a second planet toothing and again axially offset a third planet toothing are moulded; wherein the first drive-side shaft and the second drive-side shaft run coaxially to one another; and wherein the first planet toothings of the planet shafts are in engagement with the first drive toothing, the second planet toothings of the planet shafts with the second drive toothing and the third planet toothings of the planet shaft with the output toothing. With this transmission arrangement, a drive power provided on two drive-side shafts can also be advantageously transmitted in the direction of a common output-side shaft.

According to an advantageous further development of the transmission arrangement according to one aspect of the invention, the first and second drive toothing prepared on the different drive shafts and the first and third planet toothings prepared on the same planet shafts are each formed as helical toothings with opposing helix angles preferentially identical in size. Because of this, forces acting on the drive toothing can be advantageously adjusted.

According to a further advantageous further development of the transmission arrangement according to one aspect of the invention, the number of the planet shafts is greater than three; wherein seen in circumferential direction the planet toothings are equally distributed; and wherein seen in axial direction the first planet toothings and the second planet toothings, just like the first drive toothing and the second drive toothing, are offset relative to one another.

According to a further advantageous further development of the transmission arrangement according to one aspect of the invention, axial bearing surfaces between the first and second drive toothings support axial forces resulting from the helical toothings of the same, and/or the first and second drive toothings are coupled via elements transmitting axial forces. This configuration of the transmission arrangement allows a particularly advantageous transmission of the drive power provided on two drive-side shafts in the direction of a common output-side shaft.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention relates to a transmission arrangement.

Figure 1:
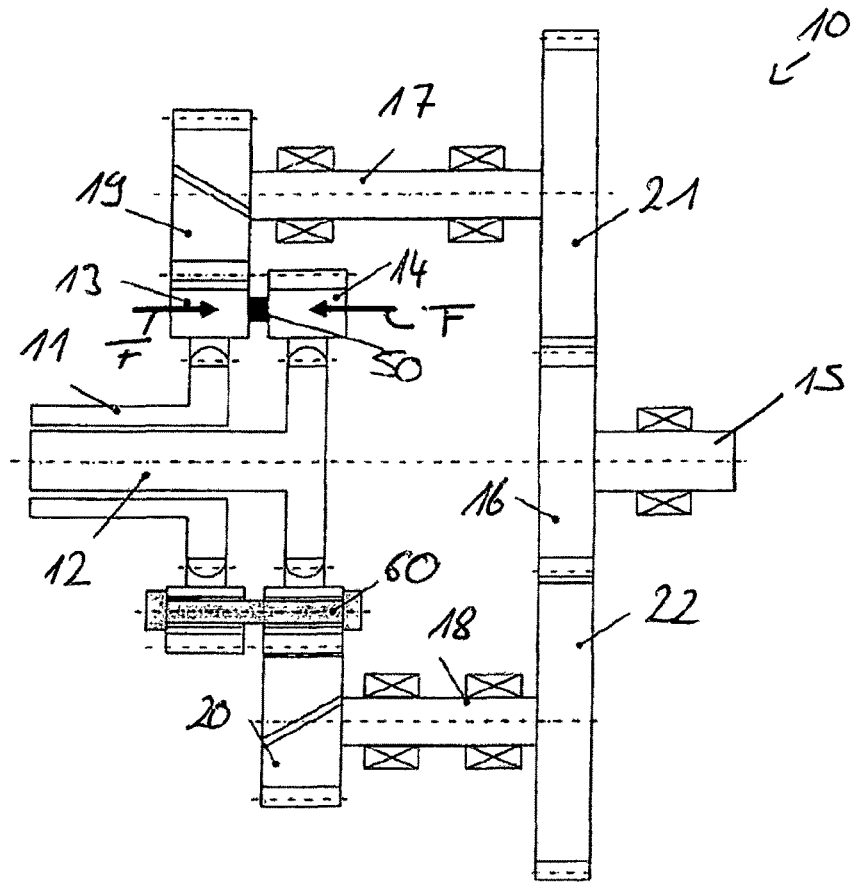
FIG. 1: is a schematic axial section of a transmission arrangement.
Figure 2:
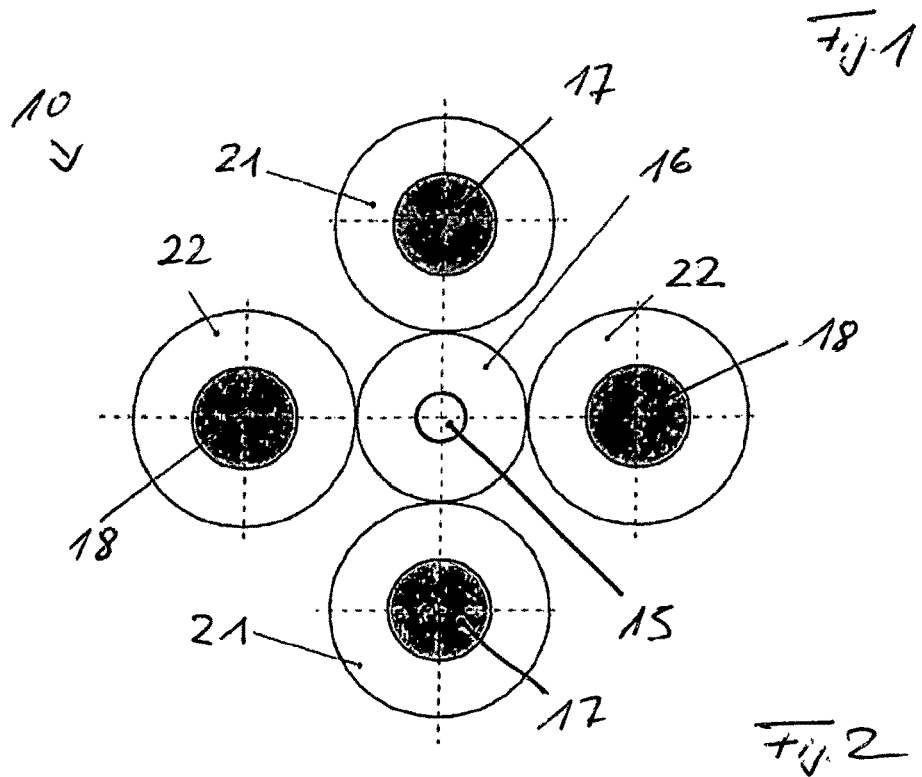
FIG. 2: is a schematic perspective view of an output-side end of the transmission arrangement of FIG. 1.

FIGS. 1 and 2 shows details of a preferred exemplary embodiment of a transmission arrangement 10 according to a first aspect of the invention present here.

The transmission arrangement 10 comprises two rotatably mounted drive-side shafts, namely a rotatably mounted first drive-side shaft 11 and a rotatably mounted second drive-side shaft 12. The two drive-side shafts 11, 12 run coaxially to one another, wherein in the shown exemplary embodiment the first drive-side shaft 11 surrounds the second drive-side shaft 12 in sections radially on the outside. Onto the first drive-side shaft 11, a first drive toothing 13 is moulded, which in the shown exemplary embodiment is provided by a gearwheel. Onto the second drive-side shaft 12 a second drive toothing 14 is moulded, which likewise is provided by a gearwheel. In addition to the two drive-side shafts 11, 12 running coaxially to one another, the transmission arrangement 10 comprises a rotatably mounted output-side shaft 15 with a drive toothing 16, which is provided by a gearwheel.

The transmission arrangement 10 according to the first aspect of the invention present here furthermore comprises a first number of first rotatably mounted planet shafts 17 and a second number of second rotatably mounted planet shafts 18. Onto each of the first planet shafts 17 a first planet toothing 19 and axially offset a third planet toothing 21 is moulded, namely in the form of gearwheels. Onto each second planet shaft 18, a second planet toothing 20 each and axially spaced a fourth planet toothing 22 is moulded, again in the form of gearwheels.

The first planet toothings 19 of the first planet shafts 17 are in engagement with the first drive toothing 13 of the first drive-shaft 11. Compared with this, the second planet toothings of the second planet shafts 18 are in engagement with the second drive toothings 14 of the second drive-shaft 12. The third planet toothings 21 of the first planet shaft 17 and the fourth planet toothings 22 of the second planet shaft 18 are each jointly in engagement with the output toothing 16 of the output-side shaft 15.

As is evident from FIG. 1, the two drive toothings 13, 14 of the two drive-side shafts 11, 12 are offset relative to one another in axial direction. Likewise, the first planet toothings 19 of the first planet shafts 17 and the second planet toothings 20 of the second planet shafts 18 are offset relative to one another in axial direction. Here, the first planet toothings 19 of the first planet shafts 17 are arranged together with the first drive toothing 13 of the first drive-side shaft 11 in a first plane, wherein the second planet toothings 20 of the second planet shafts 18 are arranged together with the second drive toothing 14 of the second drive-side shaft 12 in a second plane which is axially offset thereto.

The third planet toothings 21 of the first planet shafts 17 and the fourth planet toothings 22 of the second planet shafts 18 are positioned together with the output toothing 16 of the output-side shaft 15 in a third plane, which in turn is axially offset relative to the two planes, in which the drive toothings 13, 14 are positioned.

Preferentially, the number of the first planet shafts 17 and the number of the second planet shafts 18 is greater or equal to two in each case, particularly preferably the first number of the first planet shafts 17 corresponds to the second number of the second planet shafts 18. As is evident from FIG. 2, two first planet shafts 17 and two second planet shafts 18 are present in the exemplary embodiment of FIGS. 1 and 2. The first planet toothings 19 and the second planet toothings 20 are, just like the third planet toothings 21 and the fourth planet toothings 22, each equally distributed as seen in circumferential direction namely in such a manner that between two adjacent first planet toothings 19 in each case a second planet toothing each and between two adjacent third planet toothings 21 in each case a fourth planet toothing 22 each is positioned.

Accordingly, drive power in the transmission arrangement of FIGS. 1 and 2, is provided on two drive-side shafts 11 and 12 running coaxially to one another. At the end of the two drive-side shafts 11 and 12, gearwheels are attached in a rotationally fixed manner, which provide the drive toothings 13 and 14. This can be affected by way of angle-compensating couplings such as for example curved-tooth couplings.

The drive toothings 13, 14 are, just like the first and second planet toothing 19 and 20 interacting with the same, are formed as helical toothings each with opposing helix angles, wherein the amount of the opposing helix angles is preferentially identical.

The first planet toothings 19 of the first planet shafts 17 interact with the first drive toothing 13 of the first drive-side shaft 11, whereas the second planet toothings 20 of the second planet shafts 18 interact with the second drive toothing of the second drive-shaft 12. The first and second planet toothing 19 and 20 are preferentially provided by gearwheels attached to the respective planet shafts 17, 18 in a rotationally fixed manner.

The third and fourth planet toothings 21, 22 of the first and second planet shafts 17 and 18 are likewise preferentially provided by gearwheels, which in turn are connected to the respective planet shaft in a rotationally fixed manner.

The third and fourth planet toothings 21, 22 of the first and second planet shafts 17, 18, which interact or mesh with the output toothing 16 of the output-side shaft 15 are preferentially helically-cut. Here, the third planet toothing 21 preferentially has the same helix angle as the fourth planet toothing 22.

Figure 3:
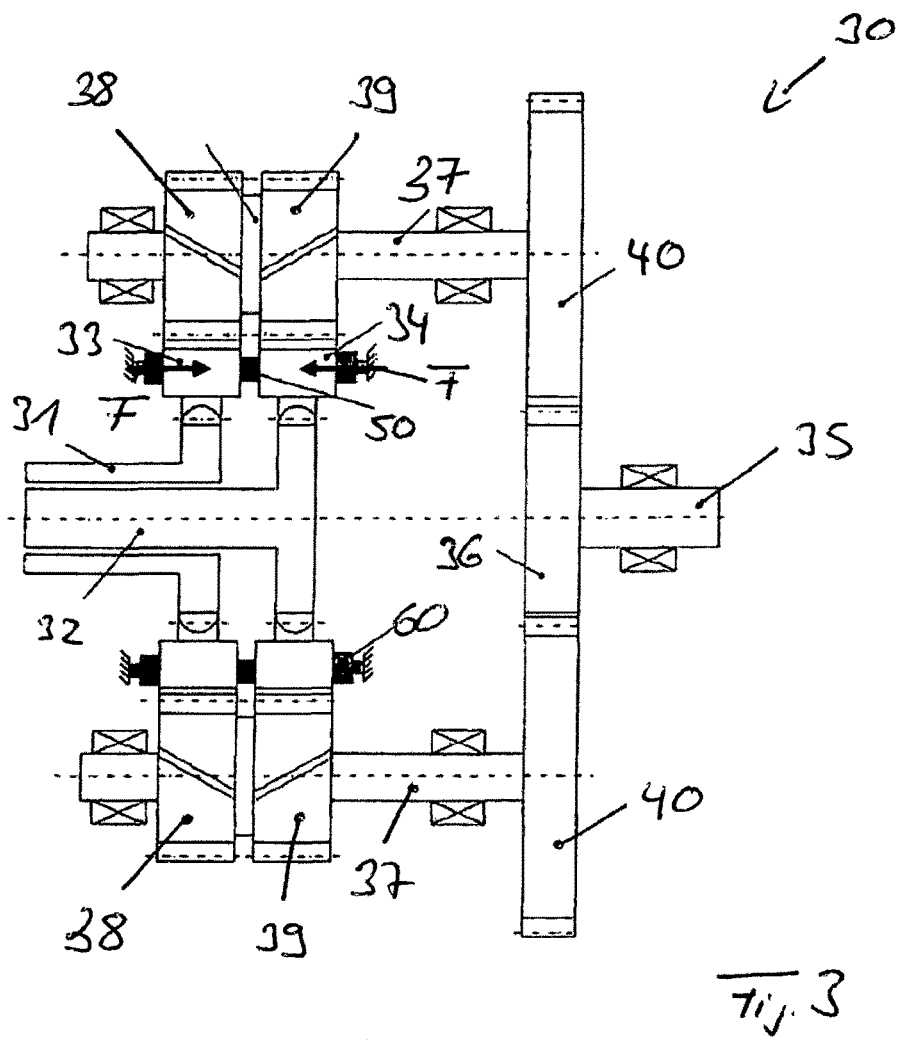
FIG. 3: is a schematic axial section of a transmission arrangement.
Figure 4:
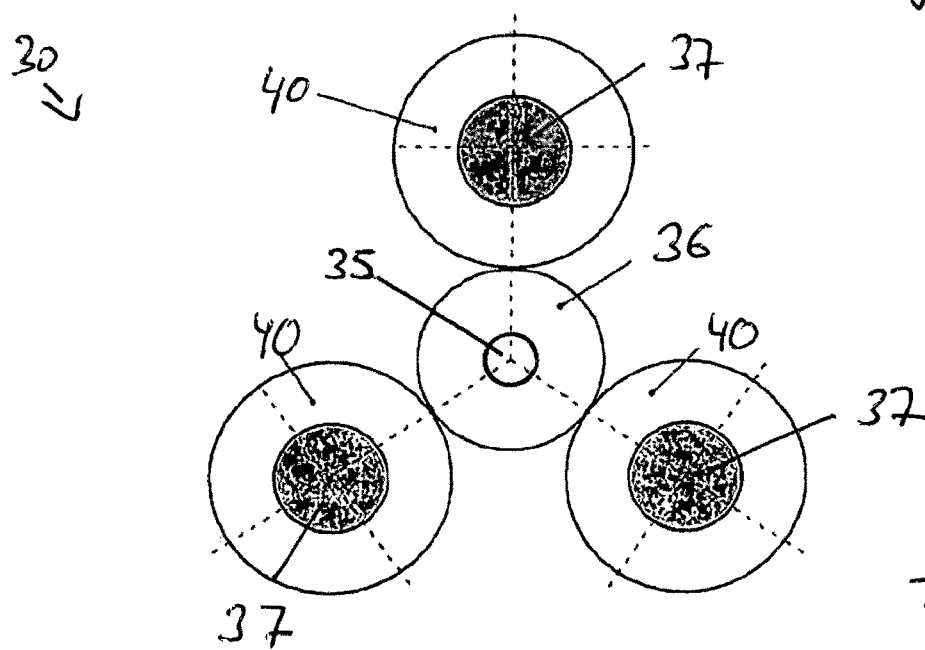
FIG. 4: is a schematic perspective view of a drive-side end of the transmission arrangement of FIG. 3.

A second transmission arrangement 30 according to the invention, which serves for transmitting drive power provided by two drive-side shafts in the direction of a common output-side shaft, is shown in FIGS. 3 and 4. Accordingly, FIG. 3 again shows two drive-side shafts 31 and 32 running coaxially to one another, wherein each of these two drive-side shafts 31 and 32 respectively is assigned a drive toothing 33 and 34 respectively, which is preferentially provided by a gearwheel in each case, which is connected in a rotationally fixed manner to an end of the respective drive-side shaft 31 and 32 respectively.

The transmission arrangement 30 of FIGS. 3 and 4 furthermore has an output-side shaft 35 with an output toothing 36, which in turn is provided by a gearwheel, which is connected to the output-side shaft 35 in a rotationally fixed manner.

In addition to these two drive-side shafts 31, 32 and the output-side shaft 35, the planet gear set 30 of FIGS. 3 and 4 comprises a plurality of planet shafts 37. Each of the planet shafts 37 has a total of three planet toothings, namely a first planet toothing 38, axially offset thereto a second planet toothing 39 and again axially offset thereto a third planet toothing 40. The first planet toothings 38 of the planet shafts 37 mesh with the first drive toothing 33 of the first drive-side shaft 31 and are positioned with the same in a first plane. The second planet toothings 39 of the planet shafts 37 mesh with the second drive toothing 34 of the second drive-side shaft 32 and are positioned with the same in a second plane, which is axially offset relative to the first plane. The third planet toothings 40 of the planet shafts 37 mesh with the drive toothing 36 of the common output-side shaft 35, wherein the third planet toothings 40 together with the output toothing 36 are arranged in a third plane, which are axially offset relative to the first and second plane.

In the shown exemplary embodiment, three planet shafts 37, each with a first planet toothing 38, each with a second planet toothing 39 and each with a third planet toothing 40 are present, wherein the planet toothings 38, 39 and 40 are each equally distributed seen in circumferential direction.

The planet toothings 38, 39 and 40 are provided by gearwheels which are connected to the respective planet shaft 37 in a rotationally fixed manner.

The first and second planet toothings 38, 39 of the planet shafts 37 are each helically cut in opposite directions. The planet shafts 37 are each helically cut in opposite direction. The planet shafts 37 are preferentially freely moveable in axial direction in order to make possible an axial load compensation between the drive toothings 33, 34. The third planet toothings are preferentially straight-toothed just like the output toothing 36.

In both drive arrangements 10, 30, i.e. with both aspects of the invention, it is preferentially provided to support axial forces F, which can act on the drive toothings 13, 14 during the operation, and which originate from the helical toothings of the drive toothings 13, 14, by way of axial bearing surfaces 50 on the drive toothings 13, 40. In the predominant torque direction, these axial forces have a tendency, as shown in FIGS. 1 and 3, to move the drive toothings 13, 14 and 33, 34 respectively towards one another. With opposing torque directions, as a consequence of which the drive toothings 13, 14 and 33, 34 respectively would be pushed apart, this axial shift can be preferentially stopped by an element 60 transmitting axial forces, for example by a plurality of tension rods or other constructions, such as for example angular rings, which support the drive toothings 13, 14 and 33, 34 respectively in axial direction.

With both transmission arrangements according to the invention, torque, which is provided on two drive-side shafts which run coaxially to one another, can be particularly advantageously transmitted in the direction of a common output-side shaft. To this end, the torques provided on the drive-side shafts are initially divided and subsequently joined onto the common output-side shaft.

The desired distribution of the torques is brought about by the equilibrium of the axial forces on the drive toothings, wherein by way of the helix angle of these toothings the ratio of the radial forces is also fixed. With same axial forces and same helix angles, same circumferential forces or radial forces are obtained.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A transmission arrangement, comprising:
   a rotatably mounted first drive-side shaft, which is assigned a first drive toothing;
   a rotatably mounted second drive-side shaft, which is assigned a second drive toothing;
   a first coupling element configured to transmit respective axial forces to the first and second drive toothings biasing the first and second drive toothings towards one another;
   a rotatably mounted output-side shaft, which is assigned an output toothing;
   a first number of first planet shafts, wherein each of the first planet shafts is assigned a respective first planet toothing in engagement with the first drive toothing and an axially offset third planet toothing in engagement with the output toothing; and
   a second number of second planet shafts, wherein each of the second planet shafts is assigned a respective second planet toothing in engagement with the second drive toothing and an axially offset fourth planet toothing in engagement with the output toothing;
   wherein the first drive-side shaft and the second drive-side shaft are coaxial to one another.

2. The transmission arrangement according to claim 1, wherein the first and second drive toothing and the first and second planet toothings are each formed as helical toothings with opposing helix angles.

3. The transmission arrangement according to claim 1,
   wherein the first number of first planet shafts and the second number of second planet shafts is greater than or equal to two;
   wherein the first planet toothings and the second planet toothings are equally distributed in circumferential direction such that between each two adjacent first planet toothings a second planet toothing is positioned;
   wherein the first planet toothings and the second planet toothings are axially offset relative to one another; and
   wherein the first drive toothing and the second drive toothing are axially offset relative to one another.

4. The transmission arrangement according to claim 1, wherein the third planet toothings, the fourth planet toothings, and the output toothing are arranged in one radial plane.

5. The transmission arrangement according to claim 2, wherein a second coupling element configured as axial bearing surfaces between the first and second drive toothings support axial forces resulting from the helical toothings.

6. The transmission arrangement according to claim 1, wherein the first coupling element transmitting axial forces is configured as one of tension rods and angular rings.

7. The transmission arrangement according to claim 2, wherein the opposing helix angles are of identical size.

8. A transmission arrangement, comprising:
   a rotatably mounted first drive-side shaft, which is assigned a first drive toothing;
   a rotatably mounted second drive-side shaft, which is assigned a second drive toothing;

a first coupling element configured to transmit respective axial forces to the first and second drive toothings biasing the first and second drive toothings towards one another;

a rotatably mounted output-side shaft, which is assigned an output toothing; and planet shafts, wherein each planet shaft is assigned a first planet toothing, a second planet toothing, and a third planet toothing, each of the first, second, and third planet toothings being axially offset from each other;

wherein the first planet toothings are in engagement with the first drive toothing;

wherein the second planet toothings are in engagement with the second drive toothing; and wherein the third planet toothings are in engagement with the output toothing; and wherein the first drive-side shaft and the second drive-side shaft are coaxial to one another.

9. The transmission arrangement according to claim 8, wherein the first and second drive toothing and the first and third planet toothings are formed as helical toothings with opposing helix angles.

10. The transmission arrangement according to claim 8, wherein:
   there are at least two of the planet shafts;
   the first, second, and third planet toothings are equally distributed in circumferential direction; and
   the first and second planet toothings and the first and second drive toothing are axially offset relative to one another.

11. The transmission arrangement according to claim 8, wherein the third planet toothings are positioned with the output toothing in one radial plane.

12. The transmission arrangement according to claim 9, wherein the opposing helix angles are identical in size.

13. The transmission arrangement according to claim 9, wherein a second coupling element configured as axial bearing surfaces between the first and second drive toothings support axial forces resulting from the helical toothings.

14. The transmission arrangement according to claim 8, wherein the first coupling element transmitting axial forces is configured as one of tension rods and angular rings.

* * * * *